(12) United States Patent
Chiang

(10) Patent No.: US 7,817,138 B2
(45) Date of Patent: Oct. 19, 2010

(54) MOUSE HAVING COMPOSITE SWITCH DEVICE

(75) Inventor: Hsiao-Lung Chiang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 602 days.

(21) Appl. No.: 11/937,322

(22) Filed: Nov. 8, 2007

(65) Prior Publication Data

US 2008/0266258 A1 Oct. 30, 2008

(30) Foreign Application Priority Data

Apr. 27, 2007 (TW) .............................. 96114910 A

(51) Int. Cl.
*G06F 3/033* (2006.01)
(52) U.S. Cl. .................. 345/163; 345/156; 341/23; 463/37
(58) Field of Classification Search ................. 345/156, 345/157, 160, 163–168; 341/21–23; 463/37
See application file for complete search history.

(56) References Cited

U.S. PATENT DOCUMENTS

| | | | |
|---|---|---|---|
| 6,011,543 A * | 1/2000 | Tian ............................ 345/163 |
| 6,166,721 A * | 12/2000 | Kuroiwa et al. ............. 345/163 |
| 6,275,215 B1* | 8/2001 | Kim ............................ 345/163 |
| 6,344,643 B1* | 2/2002 | Chen ........................... 250/221 |
| 6,525,713 B1* | 2/2003 | Soeta et al. .................. 345/160 |
| 2002/0084986 A1* | 7/2002 | Armstrong ................... 345/163 |
| 2006/0244726 A1* | 11/2006 | Wang et al. .................. 345/163 |
| 2007/0063969 A1* | 3/2007 | Wright ........................ 345/156 |
| 2007/0115259 A1* | 5/2007 | Pai .............................. 345/163 |
| 2007/0247426 A1* | 10/2007 | Vorst ........................... 345/163 |
| 2009/0040175 A1* | 2/2009 | Xu et al. ...................... 345/156 |

* cited by examiner

*Primary Examiner*—Kimnhung Nguyen
(74) *Attorney, Agent, or Firm*—Kirton & McConkie; Evan R. Witt

(57) ABSTRACT

The present invention relates to a mouse having a composite switch device. The composite switch device includes a push button, a multi-stage sliding switch unit and a tactile switch unit. By moving a single push button to different positions, the use modes of the mouse will be switched.

4 Claims, 4 Drawing Sheets

1

MOUSE HAVING COMPOSITE SWITCH DEVICE

FIELD OF THE INVENTION

The present invention relates to a mouse, and more particularly to a mouse having a composite switch device.

BACKGROUND OF THE INVENTION

Due to the amazing power of personal computers, personal computers are developed to have various functions. Typically, the mouse is used as a cursor control device for controlling cursor movement on the computer monitor. Recently, the mouse is used as various input control device under execution of different software.

For complying with diversified functions of the personal computer, in addition to the conventional cursor control function, the mouse may be used as for example a controller for presentation control and/or multimedia (e.g. music or movies) control. For example, during the process of making a presentation, the mouse is usually used as a remote controller for controlling playback of presentation slides. When the personal computer is used as a multimedia tool, the mouse is operated to control playback of music or movies.

Depending on the applications of the personal computer, the functions of identical buttons of the mouse are varied. For example, in a case that the mouse is a cursor control device for the personal computer, a specified item on the option menu of the computer monitor is selected by operating the specified buttons of the mouse. During the process of making a presentation, a "Page Up" function is executed to have the slide backward to the previous page or a "Page Down" function is executed to have the slide forward to the next page by operating the specified click buttons. In the multimedia operating mode, the specified buttons of the mouse are actuated to provide volume up and volume down functions.

For switching the functions of identical buttons when the mouse is operated in different use modes, two approaches are commonly provided. In the first approach, a graphic-based user interface is created under execution of a switching program. Via the user interface, a desired use mode is selected by the user. In the second approach, multiple switch devices are arranged on the mouse. These switch devices are activated to execute corresponding functions.

As previously described, the desired use mode is selected after the user interface is created. For a purpose of changing the use mode, the user interface should be created again to select another use mode. The first approach, however, is not user-friendly. The arrangement of multiple switch devices may avoid switching the use modes under execution of the switching program. However, too many switch devices will increase the volume and the cost of the mouse.

In views of the above-described disadvantages resulted from the prior art, the applicant keeps on carving unflaggingly to develop an improved mouse according to the present invention through wholehearted experience and research.

SUMMARY OF THE INVENTION

It is an object of the present invention to provide a mouse having a composite switch device, in which the use modes of the mouse may be switched by operating the composite switch device.

In accordance with an aspect of the present invention, there is provided a mouse having a composite switch device. The mouse includes a main body, an upper cover, a push button, a circuit board, a multi-stage sliding switch unit and a tactile switch unit. The main body has an elongated concave portion in an upper surface thereof, wherein a stopping element is arranged at a short edge of the elongated concave portion. The upper cover shelters the upper surface of the main body, and includes a perforation therein. The push button is received within the elongated concave portion, movable along the elongated concave portion in a horizontal direction and exposed to the perforation of the upper cover. The push button includes a tongue depressor extended from an end of the push button, a clamp part and a touch part arranged on the bottom of the push button. The circuit board is disposed within the main body. The multi-stage sliding switch unit is electrically connected to the circuit board, and operated in a first mode or a second mode. The multi-stage sliding switch unit has a gliding arm clamped by the clamp part of the push button such that the gliding arm is moved to a first position or a second position with movement of the push button. The multi-stage sliding switch unit is operated in the first mode when the gliding arm is located at the first position, and the multi-stage sliding switch unit is operated in the second mode when the gliding arm is located at the second position. The tactile switch unit is disposed on the circuit board and includes a triggering part. The tongue depressor of the push button is separated from the stopping element and the touch part of the push button is aligned with the triggering part of the tactile switch unit when the gliding arm is located at the first position. Whereas, the tongue depressor of the push button lies on the stopping element when the gliding arm is located at the second position.

In an embodiment, the mouse further includes a fixing ring-member, which is arranged between the upper cover and the push button for facilitating fixing the push button in the elongated concave portion.

In an embodiment, the multi-stage sliding switch unit is a three-stage sliding switch unit, which is optionally operated in a third mode.

In an embodiment, the multi-stage sliding switch unit is operated in the third mode and the tongue depressor of the push button lies on the stopping element when the gliding arm is located at a third position.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
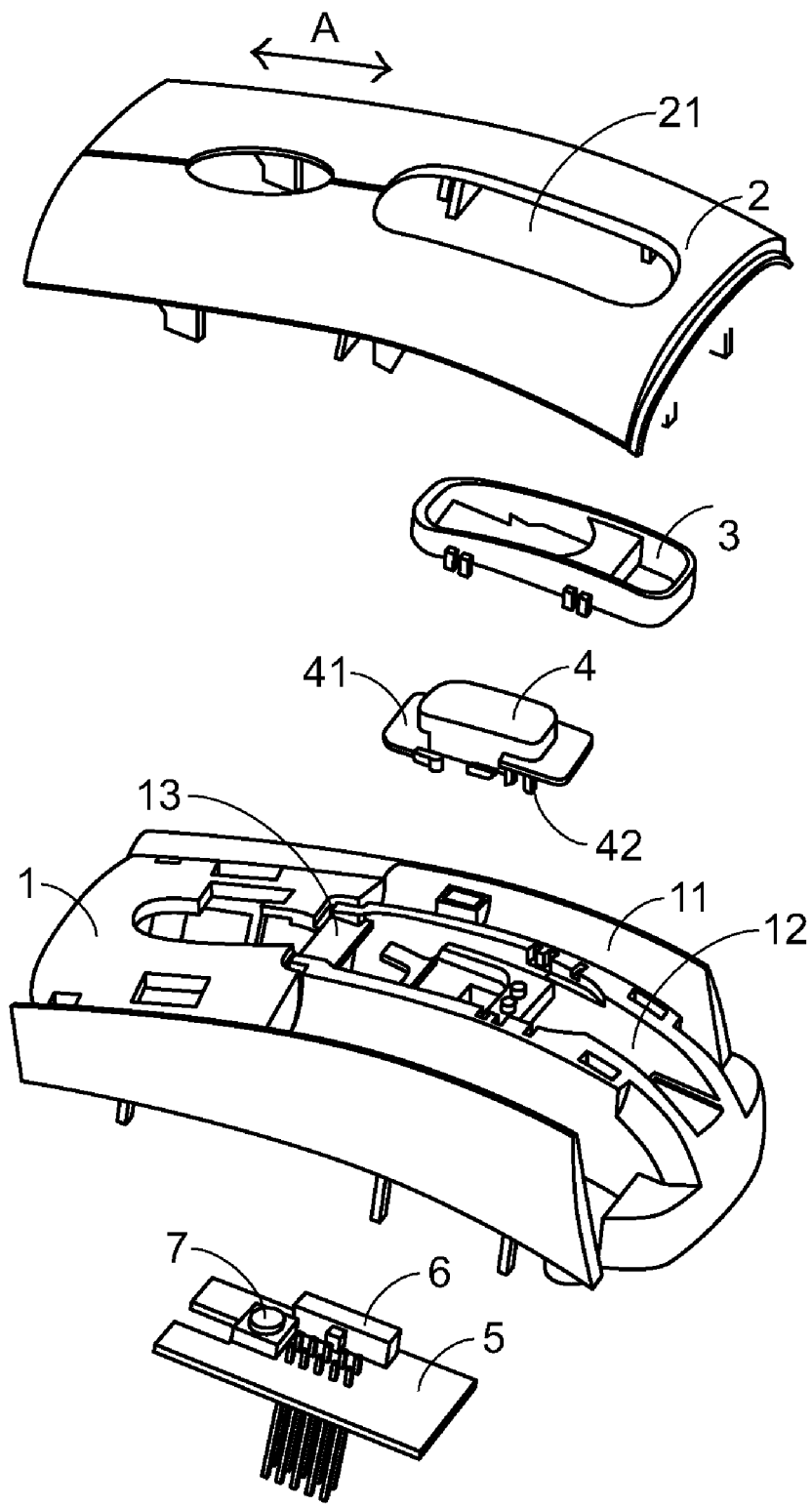
FIG. 1 is a schematic exploded view of a mouse having a composite switch device according to a preferred embodiment of the present invention.

FIG. 1 is a schematic exploded view of a mouse having a composite switch device according to a preferred embodiment of the present invention. The mouse of FIG. 1 principally includes a main body 1, an upper cover 2, a fixing ring-member 3, a push button 4, a circuit board 5, a multi-stage sliding switch unit 6 and a tactile switch unit 7.

The main body 1 has an elongated concave portion 12 in the upper surface 11 thereof. A stopping element 13 is arranged at a short edge of the elongated concave portion 12. The upper surface 11 of the main body 1 is covered by the upper cover 2. The upper cover 2 has a perforation 21 therein. The push button 4 is received within the elongated concave portion 12 and movable along the elongated concave portion 12 in the direction indicated as the arrow A. The fixing ring-member 3 is arranged between the upper cover 2 and the push button 4 for facilitating fixing the push button 4 in the elongated concave portion 12. In addition, the push button 4 has a tongue depressor 41 extended from an end thereof.

Figure 2:
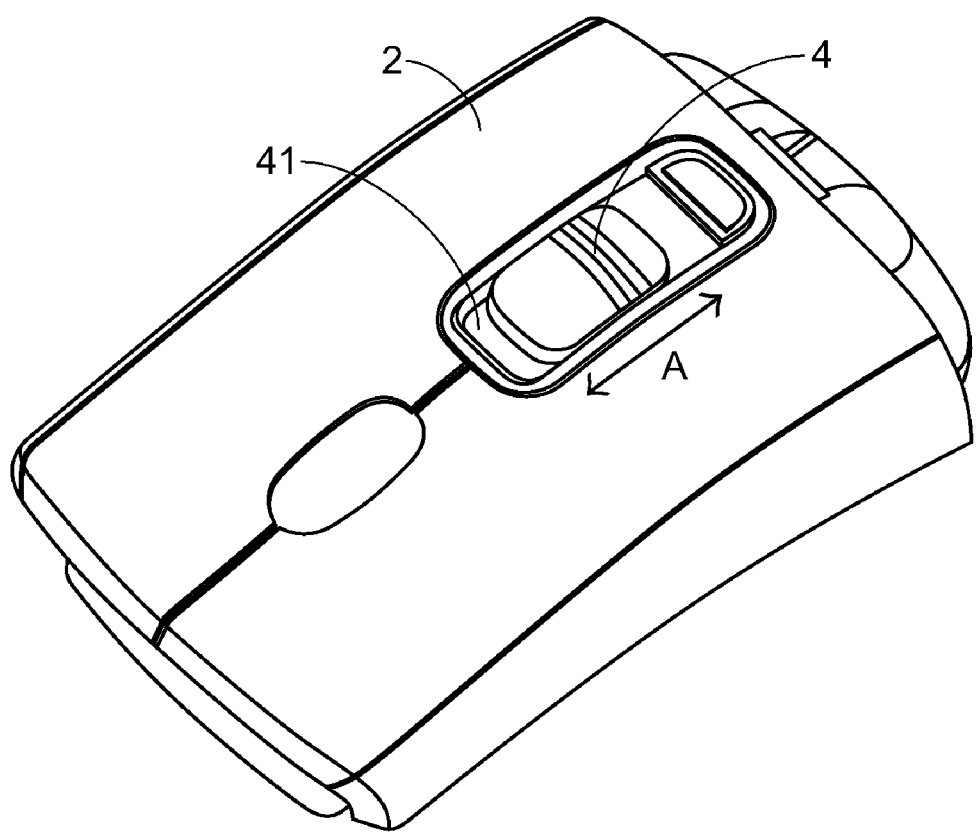
FIG. 2 is an assembled view of the mouse of FIG. 1.

The assembled view of the mouse is schematically illustrated in FIG. 2. As shown in FIG. 2, the push button 4 is protruded from the outer surface of the upper cover 2 such that the push button 4 may be manipulated by a user. By moving the push button 4 in the direction indicated as the arrow A, the mouse may be operated in a specified use mode as required.

Figure 3A:
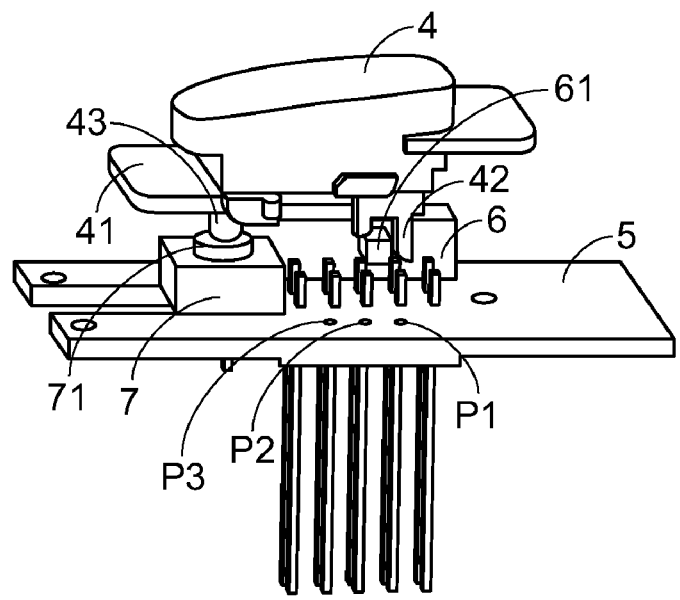
FIGS. 3A and 3B are schematic views illustrating relative locations between the push button and the three-stage sliding switch unit when the mouse is operated in a presentation mode.
Figure 3B:
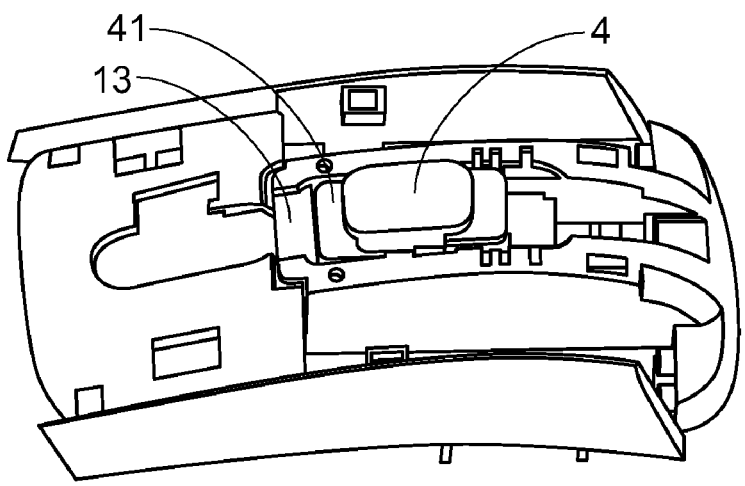

FIG. 3A is a schematic perspective view illustrating the combination of the push button 4, the multi-stage sliding switch unit 6 and the tactile switch unit 7 of the mouse in a first use mode. As shown in FIG. 3A, the push button 4 includes a tongue depressor 41, a clamp part 42 and a touch part 43. The multi-stage sliding switch unit 6 and the tactile switch unit 7 are disposed on the circuit board 5. An exemplary multi-stage sliding switch unit 6 is a three-stage sliding switch unit. The three-stage sliding switch unit 6 includes a gliding arm 61. The tactile switch unit 7 includes a triggering part 71. Referring to FIG. 3B, the location of the push button 4 relative to the stopping element 13 of the main body 1 of the mouse in the first use mode is shown.

Hereinafter, the operations of the three-stage sliding switch unit 6 will be illustrated with reference to FIG. 3A. Along the direction indicated as the arrow A (FIG. 2), the gliding arm 61 may be moved to a first position P1, a second position P2 or a third position P3. Depending on the positions of the gliding arm 61, the use modes of the mouse are varied. For example, in a case that the gliding arm 61 is adjusted to the first position P1, the mouse is operated in a presentation mode. In another case that the gliding arm 61 is adjusted to the second position P2, the mouse is operated in a cursor control mode (i.e. as the general mouse). In a further case that the gliding arm 61 is adjusted to the second position P3, the mouse is operated in a multimedia mode.

Referring to FIGS. 3A and 3B again, the relative locations between the push button 4 and the gliding arm 61 when the mouse is operated in a presentation mode are schematically illustrated. Since the gliding arm 61 of the three-stage sliding switch unit 6 is clamped by the clamp part 42 of the push button 4, the position of the gliding arm 61 is adjusted with movement of the push button 4. For example, as shown in FIGS. 3A and 3B, the gliding arm 61 is adjusted to the first position P1, so that the mouse is operated in a presentation mode. In this presentation mode, the tactile switch unit 7 is activated to control playback of presentation slides. When the gliding arm 61 is located at the first position P1, the tongue depressor 41 of the push button 4 is separated from the stopping element 13 and the touch part 43 of the push button 4 is aligned with the triggering part 71 of the tactile switch unit 7. In a case that the gliding arm 61 is located at the first position P1 and the mouse is operated in the presentation mode, the triggering part 71 of the tactile switch unit 7 is triggered to generate to a presentation control signal when touch part 43 of the push button 4 is pressed down. In response to the presentation control signal, for example, a "Page Up" function is executed to have the slide backward to the previous page or a "Page Down" function is executed to have the slide forward to the next page.

Figure 4A:
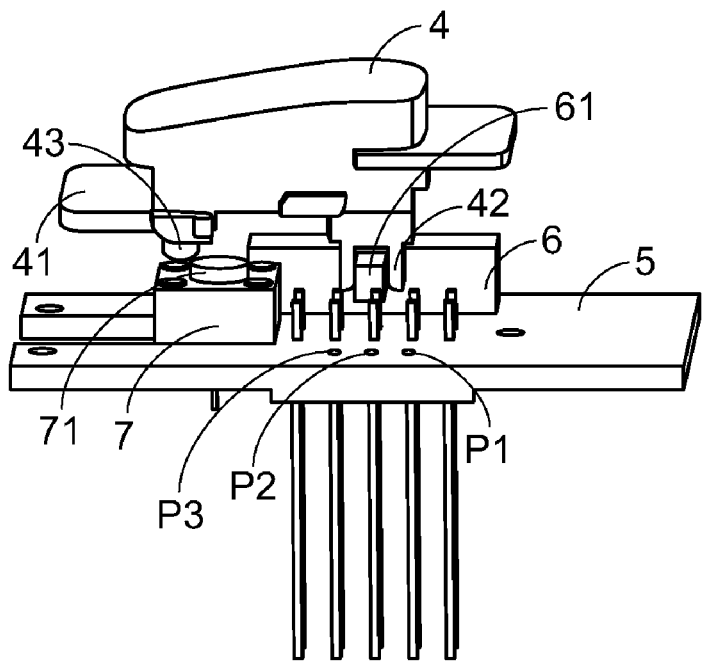
FIGS. 4A and 4B are schematic views illustrating relative locations between the push button and the three-stage sliding switch unit when the mouse is operated in a general mouse mode.
Figure 4B:
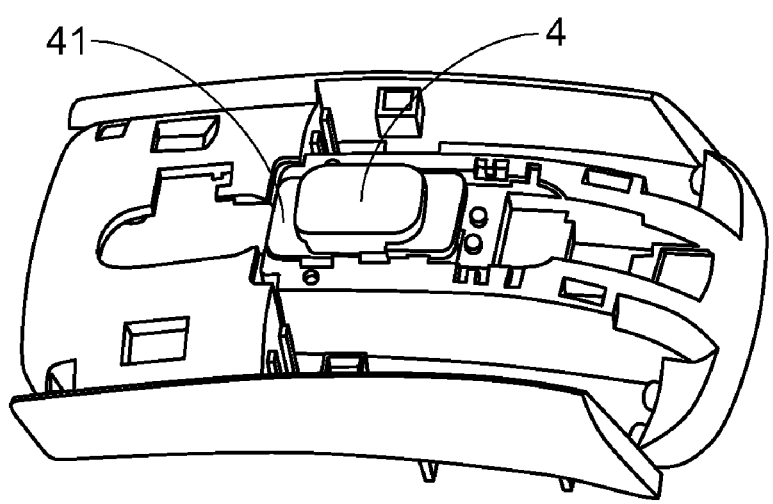

Referring to FIGS. 4A and 4B again, the relative locations between the push button 4 and the gliding arm 61 when the mouse is operated in a cursor control mode (i.e. as the general mouse) are schematically illustrated. With movement of the push button 4, the gliding arm 61 is adjusted to the second position P2, so that the mouse is operated in the cursor control mode. When the gliding arm 61 is located at the second position P2, the tongue depressor 41 of the push button 4 lies on the stopping element 13. Meanwhile, the touch part 43 of the push button 4 is no longer aligned with the triggering part 71 of the tactile switch unit 7. In this general mouse mode, the function of triggering the tactile switch unit 7 may be exempted. Even if the push button 4 is pressed down, the tongue depressor 41 of the push button 4 is stopped by the stopping element 13 from advancing downwardly and the touch part 43 of the push button 4 is no longer aligned with the triggering part 71 of the tactile switch unit 7. Under this circumstance, if the push button 4 is accidentally pressed down, no generation of an unanticipated control signal is rendered because the tactile switch unit 7 is not triggered.

Moreover, the function of triggering the tactile switch unit 7 may be exempted when the mouse is operated in the multimedia mode. Please refer to FIGS. 4A and 4B. With movement of the push button 4, the gliding arm 61 is adjusted to the third position P3, so that the mouse is operated in the multimedia mode. When the gliding arm 61 is located at the third position P3, the tongue depressor 41 of the push button 4 still lies on the stopping element 13 and the touch part 43 of the push button 4 is no longer aligned with the triggering part 71 of the tactile switch unit 7. Likewise, if the push button 4 is accidentally pressed down, no generation of an unanticipated control signal is rendered because the tactile switch unit 7 is not triggered.

From the above description, due to the specified design of the complex switch device according to the present invention, the use modes of the mouse may be switched by moving a single push button to different positions. The functions of triggering the tactile switch unit in some use modes are exempted, so that the mouse will not be suffered from an erroneous operation. Since no user interface should be created under execution of the switching program, the switching method of the mouse is more user-friendly. Moreover, since the mouse of the present invention has reduced number of push buttons, the volume and the cost thereof is decreased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mouse having a composite switch device, said mouse comprising:

a main body having an elongated concave portion in an upper surface thereof, wherein a stopping element is arranged at a short edge of said elongated concave portion;

an upper cover sheltering said upper surface of said main body, and including a perforation therein;

a push button received within said elongated concave portion, movable along said elongated concave portion in a horizontal direction and exposed to said perforation of said upper cover, wherein said push button includes a tongue depressor extended from an end of said push button, a clamp part and a touch part arranged on the bottom of said push button;

a circuit board disposed within said main body;

a multi-stage sliding switch unit electrically connected to said circuit board, and operated in a first mode or a second mode, said multi-stage sliding switch unit having a gliding arm clamped by said clamp part of said push button such that said gliding arm is moved to a first position or a second position with movement of said push button, wherein said multi-stage sliding switch unit is operated in said first mode when said gliding arm is located at said first position, and said multi-stage sliding switch unit is operated in said second mode when said gliding arm is located at said second position; and a tactile switch unit disposed on said circuit board and including a triggering part, wherein said tongue depressor of said push button is separated from said stopping element and said touch part of said push button is aligned with said triggering part of said tactile switch unit when said gliding arm is located at said first position, and said tongue depressor of said push button lies on said stopping element when said gliding arm is located at said second position.

2. The mouse having a composite switch device according to claim 1 further including a fixing ring-member, which is arranged between said upper cover and said push button for facilitating fixing said push button in said elongated concave portion.

3. The mouse having a composite switch device according to claim 1 wherein said multi-stage sliding switch unit is a three-stage sliding switch unit, which is optionally operated in a third mode.

4. The mouse having a composite switch device according to claim 3 wherein said multi-stage sliding switch unit is operated in said third mode and said tongue depressor of said push button lies on said stopping element when said gliding arm is located at a third position.

* * * * *